June 2, 1970 A. W. KYLLONEN 3,515,248

RAILWAY CAR WHEEL TREAD BRAKE APPARATUS

Filed March 28, 1968 2 Sheets-Sheet 1

INVENTOR.
ALLEN W. KYLLONEN
BY
*A. A. Steinmiller*
ATTORNEY

June 2, 1970  A. W. KYLLONEN  3,515,248
RAILWAY CAR WHEEL TREAD BRAKE APPARATUS
Filed March 28, 1968  2 Sheets-Sheet 2

INVENTOR.
ALLEN W. KYLLONEN
BY
*A. A. Steinmiller*
ATTORNEY

United States Patent Office 3,515,248
Patented June 2, 1970

3,515,248
RAILWAY CAR WHEEL TREAD
BRAKE APPARATUS
Allen W. Kyllonen, Pittsburgh, Pa., assignor to Westinghouse Air Brake Company, Wilmerding, Pa., a corporation of Pennsylvania
Filed Mar. 28, 1968, Ser. No. 716,831
Int. Cl. F16d 65/66
U.S. Cl. 188—202                                      9 Claims

ABSTRACT OF THE DISCLOSURE

A tread brake unit for a railway car wheel of the type having a power-operated brake shoe actuating lever between which lever and the brake shoe is interposed an automatically operative double-acting clutch-type slack adjuster embodying a pair of springs effective in response to rocking of the lever through a chosen angle incidental to effecting a brake application to either increase or take-up slack accordingly as the brake shoe has or has not moved into contact with the tread surface of the corresponding wheel.

Background of the invention

In Pat. 2,940,554 issued June 14, 1960, to Mortimer B. Cameron and assigned to the assignee of the present application, there is shown a fluid pressure operated package tread brake assembly that comprises a fluid motor which is operatively connected to one end of a brake lever pivotally mounted intermediate its ends and having its opposite end operatively connected to a brake rod which at one end is pivotally connected to an external hanger mounted brake-shoe-carrying brake head. This fluid pressure operated package tread brake assembly has embodied therein between the brake lever and the brake rod, a single-acting pawl and ratchet type of slack adjuster mechanism which is fully described in the above-mentioned patent.

The tread brake assemblies described in the above-mentioned patent, when used to provide the braking force on the corresponding wheels of a railway passenger car, or a rapid transit car, are often mounted on a sprung part of the car such as, for example, a truck frame which is supported on springs that rest on equalizers that are supported on the truck journal boxes. Consequently, as the load on the car increases with the number of passengers boarding the car, these tread brake assemblies are moved downward relative to the corresponding car wheels thereby increasing the normal clearance between the brake shoe of each respective brake assembly and the tread surface of its corresponding wheel under brake release conditions. Therefore, the single-acting type of slack adjuster mechanism of each brake assembly operates, when a subsequent brake application is effected, to take up slack and thereby restore the brake shoe clearance to its proper value.

Conversely, as the load on the car decreases with detraining of the passengers from the car, the tread brake assemblies are moved upward relative to the corresponding wheels, thereby decreasing the normal shoe clearance below that required. Consequently, if a brake application is subsequently effected on the lesser-loaded car, it is apparent that each brake shoe will be moved into braking contact with the tread surface of its corresponding wheel prior to the piston of the tread brake unit traveling its normal amount thereby decreasing the cylinder volume to which fluid under pressure is supplied from the usual fluid pressure reservoirs on the car by the car brake control valve device. Consequently, it is apparent that the equalization pressure will be increased which, of course, produces a corresponding higher braking force which is undesirable on the lesser-loaded car.

Accordingly, it is the general purpose of this invention to provide a fluid pressure operated package tread brake assembly that includes a novel double-acting type of slack adjuster mechanism that is operable in accordance with a variation in the normal brake shoe clearance as a result of brake shoe wear or the replacement of worn brake shoes with new shoes to take up or let out slack and also operable in accordance with a variation in the normal brake shoe clearance as a result of a change in the load carried by the car to correspondingly take up or let out slack to thereby maintain normal brake shoe clearance.

Summary of the invention

According to the present invention, a fluid pressure operated package tread brake assembly has a brake operating lever connected to an external screw-threaded brake-shoe-actuating rod by an automatically operative double-acting clutch-type slack adjuster mechanism. A fast-travel type of nut, the internal threads of which engage the threads of the actuating rod, constitutes one element of the double-acting clutch in that it has formed on its exterior two spaced-apart and oppositely arranged inclined external conical clutch faces between which are disposed two spaced-apart oppositely arranged and correspondingly inclined internal conical clutch faces formed on the inside of an annular member constituting a second clutch element which is operatively connected to the brake lever. In the brake release position of the brake lever, a spring is effective to cause engagement of one corresponding pair of clutch faces. Upon rocking in a brake-applying direction of the brake lever respectively through an angle less than or greater than a chosen angle, this spring or a second spring is rendered effective in response to disengagement of one pair of corresponding clutch faces, and prior to subsequent engagement of the other pair of corresponding clutch faces, to cause rotation of the nut relative to the brake rod to let out or take up slack to thereby maintain constant the normal clearance between the brake shoe and the tread surface of its corresponding wheel under brake release conditions.

Figure 1:
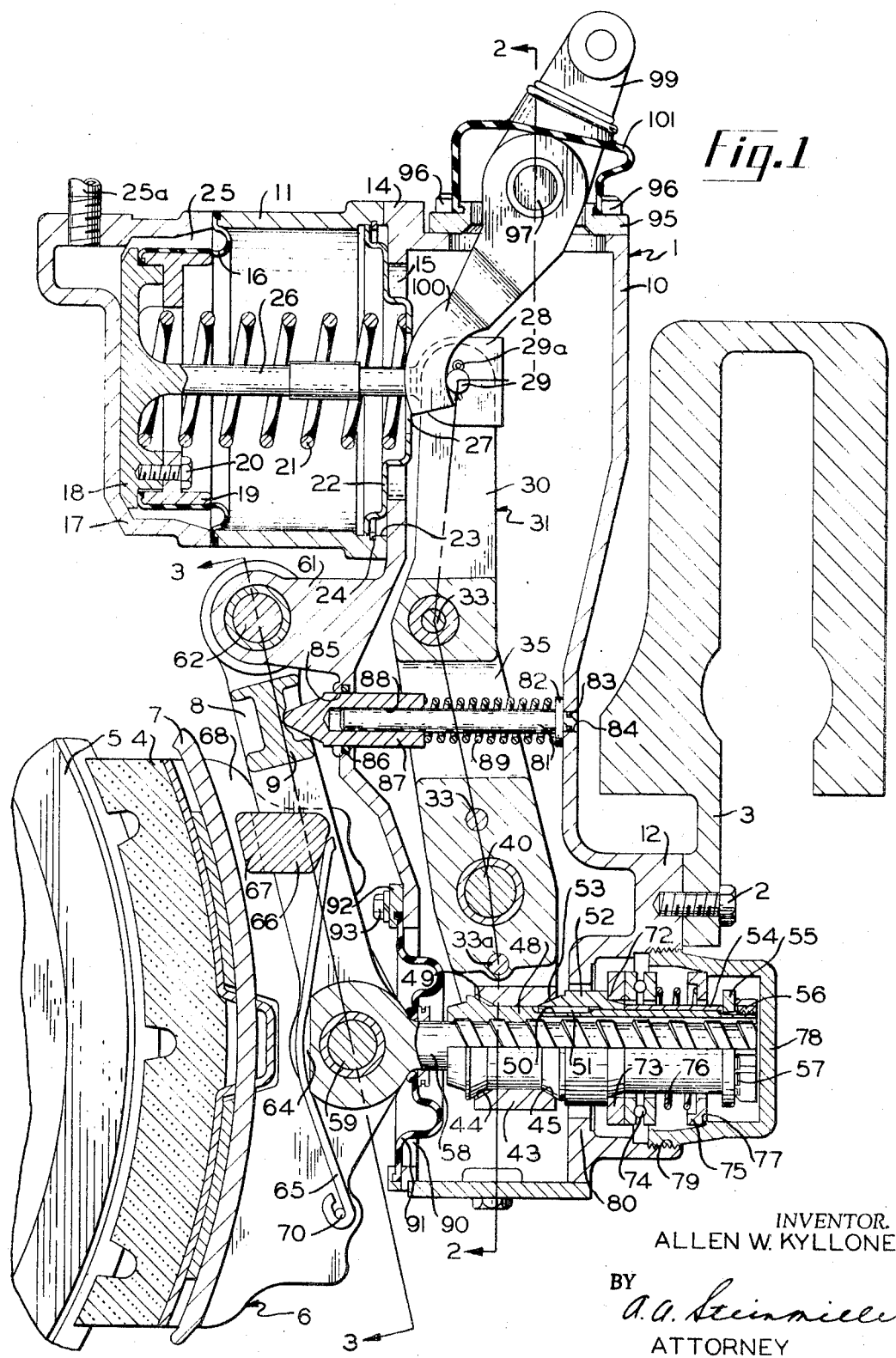
FIG. 1 is a vertical cross-sectional, view, taken along the line 1—1 of FIG. 2 and looking in the direction of the arrows, of a brake assembly showing the brake-applying linkage and the double-acting slack adjuster mechanism.

As shown in FIG. 1 of the drawings, a pneumatic tread brake assembly 1, one of which is provided for each wheel of a four-wheel two-axle railway passenger car truck, is secured, as by a plurality of cap screws 2, only one of which appears in FIG. 1, to a cross-member 3 of a sprung member, such as, for example, a truck frame that rests on a plurality of springs (not shown) which are supported on a pair of equalizers (not shown). These equalizers are disposed one on each side of the car truck and are supported at their respective opposite ends by the two journal boxes (not shown) on the corresponding side of the four-wheel two-axle car truck.

The brake assembly 1, as shown in FIG. 1, comprises a brake shoe 4, preferably of the composition type as shown, for movement into braking contact with the tread surface of a wheel 5 of the car truck, a brake head 6 to which the brake shoe 4 is secured, as by a key 7, a double link external brake head hanger 8, the two links of which are connected adjacent one end by an H-shaped web 9 integral therewith, and a sectionalized casing comprising a main casing section 10 and a brake cylinder casing section 11.

Formed integral with the main casing section 10 is a boss 12 provided with a plurality of spaced-apart screw-threaded bottom bores for receiving a like number of the cap screws 2 whereby the main casing section 10 is rigidly secured to the cross member 3 of the truck frame.

Figure 2:
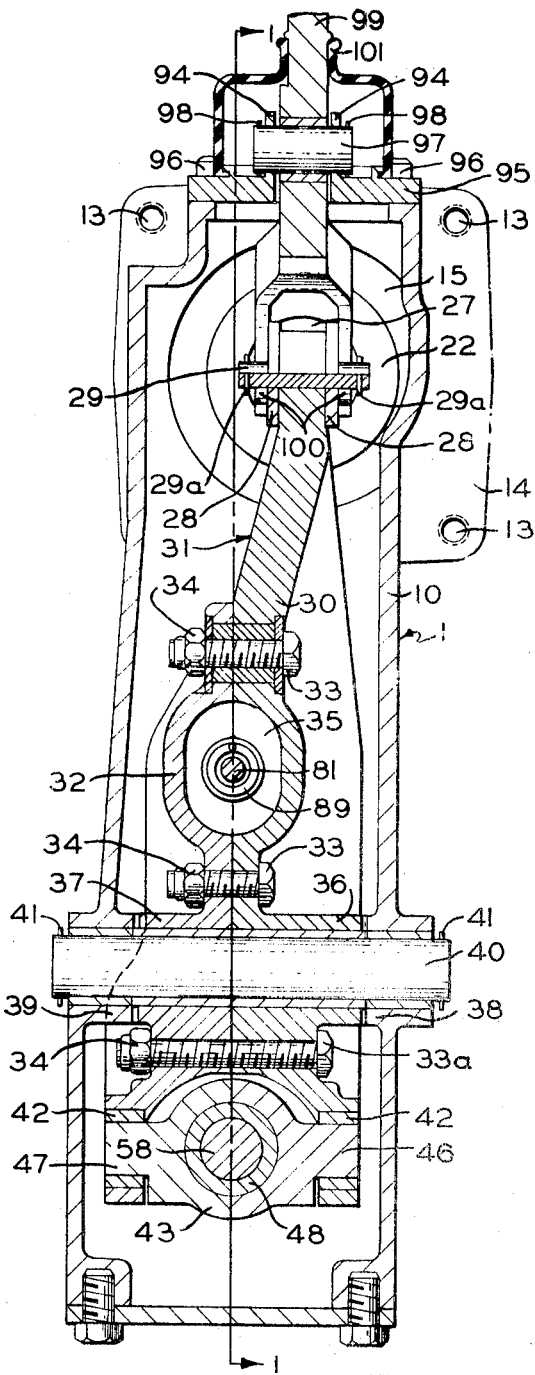
FIG. 2 is a vertical cross-sectional view, taken along the line 2—2 of the brake assembly of FIG. 1 and looking in the direction of the arrows, showing further structural details.

The brake cylinder casing section 11 is a hollow cylinder in form and is separably secured, as by a plurality of cap screws 13, the ends of three of which appear in FIG. 2 of the drawings, to a bracket 14 that is formed integral with the main casing section 10 and is provided with an opening 15 that is coaxial with hollow casing section 11.

A brake-applying movable abutment comprises a long-travel type of diaphragm 16 (FIG. 1) the outer periphery of which is clamped between the left-hand end of hollow casing section 11 and cup-shaped pressure head 17 which is secured to this end of the casing section 11 by any suitable means (not shown). The inner periphery of the diaphragm 16 is clamped between a diaphragm follower 18 and a diaphragm follower plate 19 by a plurality of cap screws 20 that pass through corresponding smooth bores in the diaphragm follower plate 19 and have screw-threaded engagement with coaxial screw-threaded bottomed bores in the diaphragm follower 18.

A release spring 21 is interposed between the diaphragm follower 18 and a dish-shaped non-pressure head 22 that is secured in a counterbore 23 at the right-hand end of the casing section 11, as by a snap ring 24, and serves to yieldingly bias the diaphragm 16 and, through a linkage to be hereinafter described, the brake shoe 4 in a brake releasing direction to a brake release position in which position they are shown in FIG. 1.

While the diaphragm 16 occupies its brake release position in which it is shown in FIG. 1, the diaphragm follower 18 contacts the pressure head 17 in which is formed a pressure chamber 25 to which fluid under pressure may be supplied through a pipe 25a. Pipe 25a may be connected to the brake cylinder pipe of a brake control valve device of the usual air brake system on railway passenger cars.

A piston rod 26 that at its left-hand end is integral with the diaphragm follower 18 extends through an opening 27 in the non-pressure head 22 into the chamber formed inside the main casing section 10. Integral with the right-hand end of the piston rod 26 is a clevis 28 which is pivotally connected, as by a pin 29 and a pair of cotter pins 29a, to the upper end of the longer member 30 of a two-member brake lever 31. The upper end of the member 30 is offset, as shown in FIG. 2, from the reminder of this member to which a second member 32 of the brake lever 31 is secured by a plurality of bolts 33, 33a and a plurality of nuts 34.

It will be noted from FIG. 2 of the drawings that the members 30 and 32 intermediate the two bolts 33 of equal length are each bowed outward so that when these members are secured together they form a substantially elliptical opening 35 the purpose of which is hereinafter made apparent. Formed on the respective members 30 and 32 of the brake lever 31 below the lower bolt 33 (FIG. 2) are two oppositely arranged and outwardly facing bosses 36 and 37 of unequal length. A pair of oppositely arranged and inwardly facing bosses 38 and 39, coaxial with the bosses 36 and 37, are formed on the opposite walls of the main casing section 10, and each of these four bosses is provided with a bore into which is press-fitted a corresponding bushing. A pin 40 extends through these bushings with a turning fit and is retained in place by a pair of cotter pins 41 at the opposite ends thereof. This pin 40 provides a fulcrum about which the brake lever 31 is rocked when a brake application is effected.

As shown in FIG. 2, the members 30 and 32 comprising the brake lever 31 are so shaped as to provide that the lower end of this lever is bifurcated and these bifurcations are provided with coaxial bores into which is press-fitted a pair of sleeve-type bearings 42.

Disposed between the bifurcations of the brake lever 31 is a hollow cylindrical clutch member 43 having at its opposite ends inclined internal clutch faces 44 and 45 (FIG. 1). As shown in FIG. 2 of the drawings, the clutch member 43 is provided with a pair of diametrically arranged trunnion lugs 46 and 47 which are rockably disposed with a turning fit in the bearings 42 carried by the bifurcations of the brake lever 31.

As shown in FIGS. 1 and 2 of the drawings, a rotatable nut member 48 extends through the hollow cylindrical clutch member 43 and is provided with an internal non-self locking type of screw thread. As shown in FIG. 1, adjacent its left-hand end, the nut member 48 is provided with an external clutch face 49 having the same angle of inclination as the internal clutch face 44 on the hollow cylindrical clutch member 43 which internal clutch face 44 is moved into clutching contact with the external clutch face 49 under certain conditions of operation hereinafter described in detail.

Intermediate its ends, the nut member 48 is provided with a keyway 50 in which is disposed a key 51 that serves to connect a sleeve member 52 to the nut member 48. This sleeve member 52 is provided on its left-hand end with an external clutch face 53 having the same angle of inclination as the internal clutch face 45 on the hollow cylindrical clutch member 43 with which it has clutching contact while in the position shown in FIG. 1.

Disposed about the nut member 48 is a sleeve 54 the left-hand end of which is retained in abutting relationship with the right-hand end of the sleeve member 52 by a washer 55 which is forced against the right-hand end of the sleeve 54 by a slotted nut 56 that has screw-threaded engagement with external screw threads formed on the right-hand end of the nut member 48 there being a lockwasher 57 disposed between the washer 55 and the nut 56. The lockwasher 57 has a single internal tab which is bent so as to be disposed in a keyway formed in the right-hand end of the nut member 48 and a plurality of arcuately-spaced extenral tabs which are bent so as to be disposed in corresponding slots in the nut 56.

Figure 3:
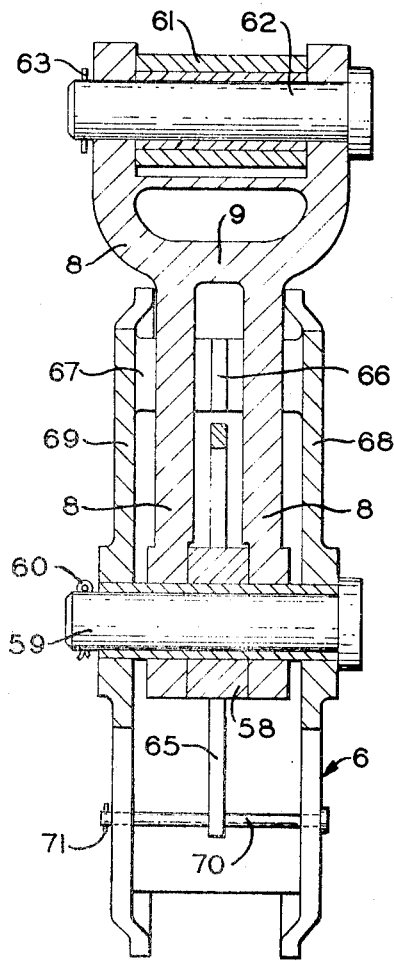
FIG. 3 is a cross-sectional view, taken along the line 3—3 of FIG. 1 and looking in the direction of the arrows, showing the structural details of a brake head and a brake head hanger by which the brake head is suspended from the brake assembly.

A brake rod 58 is externally threaded at one end with a non-self-locking type of screw thread which has screw-threaded engagement with the internal non-self-locking threads formed in the nut member 48. The other end of the brake rod 58 is pivotally connected to the lower end of the brake head hanger 8 and the brake head 6, as by a headed pin 59 and a cotter pin 60, as best shown in FIG. 3. The brake head hanger 8 comprises two identical parallel links which are integrally connected by the web 9 and suspended from a bracket 61 integral with the main casing section 10, as by means of a headed pin 62 which is held in place by a cotter pin 63 (FIG. 3). A suitable antifriction bushing is disposed, as shown in FIG. 3, in a bore in the bracket 61 for receiving the pin 62.

The left-hand end of the brake rod 58 is provided, as shown in FIG. 1, with a slot 64 in which is disposed a flat leaf-type centering spring 65. As shown in FIG. 1, the upper end of this spring 65 rests against a boss 66 that extends from one side of a web 67 that integrally connects two spaced-apart ribs 68 and 69 (FIG. 3) formed on the back of the brake head 6. The lower end of the spring 65 is bent around a headed pin 70 that extends through two coaxial bores provided in the ribs 68 and 69 and is retained in place by a cotter pin 71 carried by the pin 70 adjacent its left-hand end as viewed in FIG. 3.

As shown in FIG. 3 of the drawings, the two ribs 68 and 69 are respectively disposed in spaced-apart relation on the opposite sides of the two links comprising the brake head hanger 8 a distance of, for example, one quarter of an inch to provide for sufficient sidewise or lateral movement of the wheel tread surface and the corresponding flange at one side thereof, as the wheel and axle unit shifts laterally in the supporting truck journal boxes due to variance in the distance between the rails on which the passenger car is traveling and/or the shifting of the weight of the car as the result of the action of the centrifugal force created as the car travels around a curve, without damage to the brake shoe by the flange of the wheel or vice versa.

As shown in FIG. 1, the sleeve member 52 is provided with a shoulder 72 against which rests a washer 73 that supports on its right-hand side one race of a thrust-type ball-bearing 74 which is disposed in surrounding relation to the left-hand end of the sleeve 54. Interposed between the other race of the ball bearing 74 and a spring seat 75 is a spring 76 which is effective to normally respectively bias the ball bearing 74 against the washer 73 and the spring seat 75 against a shoulder 77 formed on a cup-shaped retaining nut member 78 that is provided with external screw threads that have screw-threaded engagement with internal screw threads formed in a bore 79 extending through the boss 12 that is integral with the main casing section 10, as hereinbofore stated.

In order to limit movement of the washer 73 and the thrust bearing 74 in the direction of the left hand, in a manner hereinafter described in detail, an annular stop 80 is formed integral with the boss 12 and is so disposed as to lie in the path of movement of the washer 73. Referring to FIG. 1, it should be noted that the distance the washer 73 must move from the position shown in the direction of the left hand until it abuts the stop 80, corresponds substantially to nominal brake shoe clearance and is the distance the brake shoe 4 must travel to bring the braking surface of the brake shoe 4 into braking contact with the tread surface of the corresponding car wheel 5. It should also be noted that the distance the washer 55 must move from the position shown in FIG. 1 in the direction of the left hand until it abuts the right-hand side of the spring seat 75 also corresponds to the nominal brake shoe clearance and is the distance the brake shoe 4 is required to travel to bring the braking surface of the shoe into braking contact with the tread surface of the corresponding wheel, or, in other words, the distance the washer 55 must move until it abuts the spring seat 75 is equal to the normal brake shoe clearance while the brakes are released, which for example, may be five-eighths of an inch.

As shown in FIG. 1, a guide rod 81 is disposed in the opening 35 in lever 31 and has a collar 82 formed integral therewith adjacent its right-hand end. Intermediate the collar 82 and the right-hand end of the rod 81 an O-ring 83 is inserted in a groove formed in the rod so that, when this right-hand end of the guide rod 81 is positioned in a bore 84 in the right-hand wall of the main casing section 10, the O-ring 83 will prevent the entrance of water into the interior of the casing section 10 via the bore 84 with which the guide rod 81 has a loose fit to facilitate assembly.

Extending through the left-hand wall of the main casing section 10 and coaxial with the bore 84 is a bore 85 the wall surface of which is provided with a groove in which is inserted an O-ring 86 which is disposed in surrounding relation to a cylindrical spring seat member 87 that is slidably mounted in the bore 85. This O-ring 86 also serves to prevent the entrance of water into the interior of the main casing section 10 via the bore 85.

The spring seat member 87 is provided with a bottomed bore 88 in which is slidably received the left-hand end of the guide rod 81. A spring 89 which is stronger than the spring 76 and disposed in surrounding relation to the guide rod 81 is interposed between the collar 82 and the right-hand end of the spring seat member 87, and is effective to always bias the left-hand end of this member 87 into contact with the web 9 of the brake head hanger 8.

As shown in FIG. 1, the left-hand end of the brake rod 58 extends through a suitable opening 90 in the left-hand wall of the main casing section 10 to the exterior thereof. In order to prevent the entrance of water, ice and dirt to the interior of the main casing section 10, a rubber boot 91 surrounds the opening 90 in the left-hand wall of the main casing section 10. The opposite ends of the boot 91 are provided with beads which fit respectively around the periphery of the brake rod 58 and into a groove formed in an annular plate 92 that is secured to the main casing section 10 as by a plurality of cap screws 93, one of which appears in FIG. 1.

In order to provide, in customary fashion, for operation of the brakes by hand brake means, a pair of parallel spaced-apart lugs 94 (FIG. 2) are formed integral with a top cover 95 which is secured to the main casing section 10 by a plurality of cap screws 96. Disposed between the lugs 94 and pivotally connected thereto intermediate its ends, as by a pin 97 and a pair of cotter keys 98, is a hand brake lever 99. The lower end of the lever 99 is bifurcated to form two fingers 100 which are disposed on the opposite sides of the jaws of the clevis 28 formed on the outer end of the piston rod 26. The fingers 100 are adapted to contact the opposite ends of the pin 29 which extends beyond the jaws of the clevis 28 to permit the lever 99 to be operatively connected to the brake lever 31. The upper end of the hand brake lever 99 may be connected through a cable and a system of pulleys (not shown) to a hand brake wheel which is located at one end of a railway car. A rubber boot 101 surrounds the lever 99 and the lugs 94 to prevent the entrance of foreign matter into the interior of the casing section 10 through the opening in the cover 95 formed between the lugs 94.

Let it be assumed that the chamber 25 of the tread brake apparatus shown in FIG. 1 is devoid of fluid under pressure and that the spring 21 has moved the diaphragm 16 and the diaphragm follower 18 to the position shown in which this follower 18 contacts the pressure head 17.

In operation, when it is desired to effect a brake application, fluid under pressure is admitted to the pressure chamber 25 through the pipe 25a which is connected to the brake control valve device of the usual air brake system on railway passenger cars. Fluid under pressure thus supplied to the chamber 25 is effective to deflect the diaphragm 16 in the direction of the right hand and thereby move the piston rod 26 and the diaphragm follower 18 in the same direction against the yielding resistance of the spring 21. As the diaphragm follower 18 and the piston rod 26 are moved in the direction of the right hand, the brake lever 31 is rocked clockwise about the pin 40. Since the brake lever 31 is pivotally connected to the clutch member 43 by means of the trunnion lugs 46 and 47 (FIG. 2), clockwise rocking of the brake lever 31 (FIG. 1) is effective to move the clutch member 43 in the direction of the left hand as viewed in FIG. 1.

It will be noted from FIG. 1 that the spring 76, the right-hand end of which rests on the spring seat 75 that abuts the shoulder 77 on the retaining nut member 78, is effective via the ball-bearing 74, and washer 73 which abuts the shoulder 72 on the sleeve member 52, to bias the external clutch face 53 on the sleeve member 52 into clutching contact with the internal clutch face 45 on the clutch member 43. Consequently, it is apparent that as the clutch member 43 is moved in the direction of the left hand in response to the clockwise rocking of the brake lever 31, as explained above, the spring 76, as it expands, is effective to maintain the external clutch face 53 on the sleeve member 52 in clutching contact with internal clutch face 45 on the clutch member 43 until the washer 73 is moved into abutting relationship with the stop 80.

Since the key 51 connects the sleeve member 52 to the nut member 48 the internal threads of which have screw-threaded engagement with the external threads formed on the brake rod 58, it is apparent that as the clutch member 43 is moved in the direction of the left hand, the spring 76 effects movement of the brake rod 58, brake head 6, and brake shoe 4 in the direction of the left hand until the washer 73 abuts the stop 80.

Assume proper or nominal brake shoe clearance between the braking surface of the brake shoe 4 and the tread surface of the wheel 5, which distance may be, for example, five-eighths of an inch, as hereinbefore stated. Therefore, the braking surface of the brake shoe 4 is moved into contact with the tread surface of the wheel 5 substantially at the same time as the washer 73 abuts the stop 80.

As the brake lever 31 continues to be rocked clockwise about the pin 40, subsequent to the braking surface of the brake shoe 4 being moved into braking contact with the tread surface of the wheel 5 by the spring 76, the clutch member 43 will be moved by the lever 31 in the direction of the left hand, as viewed in FIG. 1, relative to the now stationary brake rod 58, nut member 48 and sleeve member 52. This movement of the clutch member 43 in the direction of the left hand is effective to first move the internal clutch face 45 on the clutch member 43 out of clutching contact with the external clutch face 53 on the sleeve member 52 and thereafter, subsequent to further clockwise rocking of the lever 31 through a small angle, to move the internal clutch face 44 on this clutch member 43 into clutching contact with the external clutch face 49 on the nut member 48. The fluid under pressure present in the chamber 25 and acting on the left hand side of the diaphragm 16 is now transmitted through the diaphragm follower 18, piston rod 26, pin 29, lever 31, trunnion lugs 46 and 47, clutch member 43, nut member 48, brake rod 58, pin 59 and brake head 6 to the brake shoe 4 to effect a braking action on the wheel 5.

As the brake head 6 and the brake shoe 4 are moved as described above, these members are supported and guided by the brake head hanger 8 as this hanger is rocked about the pin 62 carried by the bushing in the bracket 61. The orientation of the hanger 8, the brake head 6, and the brake rod 58 is such that the brake head 6 and brake shoe 4 carried thereby are moved substantially radially toward the wheel 5.

When it is desired to release the brake application, the fluid under pressure supplied to the chamber 25 is vented in the usual manner to atmosphere through the pipe 25a to the brake control valve device of the car brake system, whereupon the force of the spring 21 acting on the nonpressure head 22 moves the diaphragm follower 18, diaphragm follower plate 19, diaphragm 16 and piston rod 26 in a brake releasing direction to effect counterclockwise rocking of brake lever 31 about pin 40. This counterclockwise rocking of the brake lever 31 is effective to move the clutch member 43 in the direction of the right hand, as viewed in FIG. 1. It will be understood that the springs 89 and 76 maintain the braking surface of the shoe 4 in contact with the tread surface of the wheel 5 at this time. Consequently, the internal clutch face 44 on the clutch member 43 will be moved out of clutching contact with the external clutch face 49 on the nut member 48 subsequent to which the clutch face 45 on the clutch member 43 will be moved into clutching contact with the external clutch face 53 on sleeve member 52. Thereafter, the continued movement of the clutch member 43 in the direction of the right hand in response to the continuing counterclockwise rocking of brake lever 31 is effective via the sleeve member 52, key 51, nut member 48, brake rod 58, pin 59 and brake head 6 to move the brake shoe 4 correspondingly away from the tread surface of the wheel 5 against the yielding resistance of springs 76 and 89 to effect a brake release. It should be noted that as sleeve member 52 is moved in the direction of the right hand in the manner just described, shoulder 72 thereon abuts the washer 73 on which rests the thrust bearing 74 so that this washer and thrust bearing are moved in the direction of the right hand to the position in which they are shown in FIG. 1 of the drawing.

Assume that the brake application has been effected in the manner hereinbefore described, and that, during the brake application, the braking surface of the brake shoe 4 wears away. As this wearing away of the braking surface of the brake shoe 4 occurs, the fluid under pressure acting on the diaphragm 16 is effective to cause further clockwise rocking of the brake lever 31 about the pin 40 to thereby effect movement of the clutch member 43 in the direction of the left hand, as viewed in FIG. 1, which movement is transmitted via the nut member 48 brake rod 58 pin 59 and brake head 6 to the brake shoe 4 to maintain the braking surface of this shoe 4 in braking contact with the tread surface of the wheel 5 and thus the braking force on this wheel.

It will be remembered that at the time the braking surface of the brake shoe 4 was moved into contact with the tread surface of the wheel 5, the washer 55 was moved into abutting relationship with the right-hand side of the spring seat 75. Therefore, it will be apparent from FIG. 1 that, as the brake rod 58 is moved in the manner explained above in the direction of the left hand in response to the wearing away of the braking surface of the brake shoe 4, the sleeve 54, washer 55, and nut 56 and spring seat 75 are moved in the direction of the left hand against the yielding resistance of the spring 76 so that the spring seat 75 is moved out of abutting relationship with the shoulder 77 on the retaining nut member 78.

Now let it be supposed that, subsequent to this wearing away of the braking surface of the brake shoe 4 while the brake application was in effect, the brakes are released by venting fluid under pressure from the chamber 25 to atmosphere in the usual manner hereinbefore described.

As the brake lever 31 is now rocked counterclockwise by the spring 21 in response to the venting of fluid under pressure from the chamber 25, the clutch member 43 is moved in the direction of the right hand, as viewed in FIG. 1, so that the internal clutch face 44 on this clutch member 43 is moved out of clutching contact with the external clutch face 49 on the rotatable nut member 48. It will be remembered that, as hereinbefore stated, the spring 89 is stronger than the spring 76. Consequently, it will be apparent that, upon movement of the internal clutch face 44 on the clutch member 43 in the direction of the right hand, as viewed in FIG. 1, out of clutching contact with the external clutch face 49 on the rotatable nut member 48, the spring 89 is effective, via the spring seat 87, web 9, brake head hanger 8, and pin 59, to exert a thrust or force in the direction of the left hand on the brake rod 58 which is effective, via the pin 59 and brake head 6, to maintain the braking surface of the brake shoe 4 in contact with the tread surface of the wheel 5, and simultaneously, the spring 76 is effective, via the spring seat 75, washer 55, and nut 56, to exert a thrust or force in the direction of the right hand on the rotatable nut member 48.

Since the brake rod 58 is provided with an external non-self-locking type of screw thread and the rotatable nut member 48 is provided with an internal non-self-locking type of screw thread, it will be apparent that the above-mentioned forces acting, respectively, in the direction of the left hand on the brake rod 58 and in the direction of the right hand on the rotatable nut member 48, will cause rotation or "spinning" of this nut member 48 on the stationary brake rod 58 so that this nut member 48 is moved longitudinally in the direction of the right hand along the brake rod 58 as it "spins" thereabout. The nut member 48 will thus be moved longitudinally along the brake rod 58 by the spring 76 as this nut member is "spun" thereabout by this spring until this spring 76 expands sufficiently to move the right-hand side of the spring seat 75 into abutting relationship with the shoulder 77 on the member 78.

From the foregoing, it is apparent that upon initiating a brake release, the rotatable nut member 48 is moved longitudinally along the brake rod 58 as it is "spun" thereabout, a distance corresponding to the amount of the wearing away of the braking surface of the brake shoe 4 occurring while the preceding brake application was in effect, so that the effective length of the brake rod 58 is increased to thereby maintain constant brake shoe clearance while the brakes are released.

Subsequent to cessation of longitudinal movement of the rotatable nut member 48, and the sleeve member 52 keyed thereto by the key 51, along the brake rod 58 in response to movement of the spring seat 75 into abutting relationship with the shoulder 77, the continued movement of the clutch member 43 in the direction of the right hand, as viewed in FIG. 1, in response to the continuing counterclockwise rocking of the brake lever 31, is effective to move the internal clutch face 45 on this clutch member 43 into clutching contact with the external clutch face 53 on the sleeve member 52 keyed to the now stationary rotatable nut member 48.

After the internal clutch face 45 on the clutch member 43 is thus moved into clutching contact with the external clutch face 53 on the sleeve member 52 in the manner just explained, the clutch member 43 will continue to be moved in the direction of the right hand in response to further counterclockwise rocking of the lever 31 by the spring 21 until the diaphragm follower 18 abuts the pressure head 17, as shown in FIG. 1. This further movement of the clutch member 43 in the direction of the right hand is effective to move the braking surface of the brake shoe 4 away from the tread surface of the wheel 5 since this movement of the clutch member 43 in the direction of the right hand effects movement in the same direction of the sleeve member 52, which is keyed by the key 51 to the nut member 48, that has screw-threaded engagement with the brake rod 58 connected to the brake-shoe-carrying brake head 6 by the pin 59. It will be understood that this movement of the sleeve member 52 is against the yielding resistance of spring 76 which is thus compressed until it occupies the position in which it is shown in FIG. 1.

Form the foregoing, it is apparent that the brake shoe wear occurring while a brake application is in effect is compensated for, or the slack resulting therefrom taken up, by increasing the effective length of the brake rod 58 upon initiating a brake release subsequent to such wear.

The above-described slack adjuster mechanism is also operatively effective to let out slack if at the time a brake application is effected the brake shoe clearance is less than its nominal value which, as hereinbefore stated, may be, for example five-eighths of an inch.

If the brake shoe clearance is less than its nominal value at the time a brake application is effected in the manner hereinbefore described, the braking surface of the brake shoe 4 will be moved into contact with the tread surface of the wheel 5 prior to movement of the washer 73 into abutting relationship with the stop 80. With the braking surface of the brake shoe 4 in contact with the tread surface of the wheel 5, the continued clockwise rocking of the lever 31 about the pin 40 is effective to move the clutch member 43 in the direction of the left hand to cause the internal clutch face 45 on this clutch member to move away from the external clutch face 53 on the sleeve member 52. Since the washer 73 is not in abutting relationship with the stop 80 at this time, as the internal clutch face 45 on the clutch member 43 is moved away from the external clutch face 53 on the sleeve member 52, the spring 76 is rendered effective via the bearing 74, washer 73, sleeve member 52 and key 51 to rotate or "spin" nut member 48, sleeve 54, washer 55 and nut 56 on the now stationary brake rod 58 until the washers 73 and 55 respectively are moved simultaneous into abutting relationship with the stop 80 and the spring seat 75. Thus, the external clutch face 53 on the sleeve member 52 tends to "chase" or keep up with the internal clutch face 45 on the clutch member 43 until the washers 73 and 55 abut respectively the stop 80 and the spring seat 75.

Upon movement of the washers 37 and 55 into abutting contact with the stop 80 and the spring seat 75 respectively, the rotation or "spinning" of the nut member 48, sleeve member 52 and sleeve 54 ceases. Thereafter, the continued movement of the clutch member 43 in the direction of the left hand, as viewed in FIG. 1, in response to clockwise rocking of the lever 31, is effective to move the internal clutch face 44 on the clutch member 43 into clutching contact with the external clutch face 49 on the now stationary nut member 48. The fluid under pressure present in the chamber 25 is now rendered effective in the manner hereinbefore described to effect a brake application.

When this brake application is subsequently released in the manner hereinbefore described, and the brake head 6 and brake shoe 4 moved to their release position, the distance between the braking surface of the brake shoe 4 and the tread surface of the wheel 5 will be the nominal brake shoe clearance since the nut member 48 has been advanced along the brake rod 58 a distance equal to the distance between the washer 73 and the stop 80 at the time the braking surface of the brake shoe 4 moved into contact with the tread surface of the wheel 5.

Let it be supposed that a brake application is effected in the manner hereinbefore described on a railway passenger car provided with the brake assembly constituting the present invention while no passengers are on board the car. Let it be further supposed that, while the brakes are applied, a number of passengers equal to the passenger-carrying capacity of the car go on board the car. As hereinbefore stated, the truck frame, to the cross-member 3 of which the brake assembly 1 is secured by the cap screws 2, rests on a plurality of springs which are supported on a pair of equalizers that are in turn supported on the truck journal boxes. Accordingly, it can be understood from FIG. 1, that as the load on the car, that is the number of passengers on board the car, increases, the sprung part comprising the cross-member 3 and brake assembly 1 carried thereby will be moved downward relative to the unsprung part or wheel 5 as a result of the deflection of the springs on which the truck frame rests in response to the increase in load on the car.

As the brake assembly 1 is thus moved downward relative to the wheel 5, the brake head 6 and brake shoe 4 carried thereby will be rocked clockwise about the pin 59 in order that the curvature of the braking surface of the brake shoe 4 remains in braking contact with the tread surface of the wheel 5, it being understood that by reason of the fluid pressure force transmitted to the nut member 48 and brake rod 58 from the diaphragm 16 via the brake lever 31, the nut member 48, the brake rod 58 and brake head 6 are moved in the direction of the left hand, as viewed in FIG. 1, to maintain the braking surface of the brake shoe 4 in braking contact with the tread surface of the wheel 5 and, therefore, the brakes applied.

At the time the brake application was effected, prior to any passengers going on board the car, the washers 73 and 55 were moved into abutting relationship with the stop 80 and the spring seat 75 respectively. Therefore, as the brake rod 58 and nut member 48 are moved in the direction of the left hand in the manner explained above, the washer 55, which is carried therewith, is effective to move the spring seat 75 in the direction of the left hand away from the shoulder 77 thereby compressing the spring 76.

Now let it be supposed that a brake release is effected by venting fluid under pressure from the chamber 25 to atmosphere in the usual manner.

As the brake lever 31 is now rocked counterclockwise about pin 40 by the spring 21, the internal clutch face 44 on the clutch member 43 is moved out of clutching contact with the external clutch face 49 on the rotatable nut member 48, whereupon the springs 89 and 76 are rendered effective in the manner hereinbefore explained in detail to cause the nut member 48 to "spin" about the stationary brake rod 58 and simultaneously travel longitudinally therealong until the spring 76 moves the right-hand side of the spring seat 75 into abutting relationship with the shoulder 77 on the member 78.

From the foregoing, it is apparent that upon initiating a brake release, subsequent to a sufficient number of passengers going on board the car while a brake application is in effect to load it to its passenger-carrying capacity, the rotatable nut member 48 is moved longitudinally in the direction of the right hand along the brake rod 58 a distance corresponding to the distance this brake rod 58 was moved in the direction of the left hand, while the previous brake application was in effect in order to maintain the braking surface of the brake shoe 4 in braking contact with the tread surface of the wheel 5 as the result of the change in the position of the brake shoe 4 relative to the wheel 5 caused by the car being loaded to its full passenger-carrying capacity. Consequently, when the various members comprising the brake assembly 1 are returned to the position shown in FIG. 1 of the drawing in response to the complete venting of all fluid under pressure from the chamber 25 to atmosphere, the distance or brake shoe clearance between the braking surface of the brake shoe 4 and the tread surface of the wheel 5 will be its nominal value which, as hereinbefore stated, may be, for example, five-eighths of an inch.

Let it now be supposed that subsequent to the just described brake release, and while the car is still loaded to its passenger-carrying capacity, a brake application is effected in the manner hereinbefore described. Let it be further supposed that, while this brake application is in effect and the car is stopped, all the passengers detrain from the car thereby removing the load on the car.

As the passengers detrain from the stopped car in which the brakes are applied, the springs on which the truck frame rests expand to thereby move the cross-member 3 of this truck frame and the brake assembly 1 secured thereto by the cap screws 2 upward, as viewed in FIG. 1, relative to the unsprung part or wheel 5 in response to the decrease in the load on the car.

As the brake assembly 1 is thus moved upward relative to the wheel 5, the brake head 6 and brake shoe 4 carried thereby are rocked counterclockwise about the pin 59 in order that the curvature of the braking surface of the brake shoe 4 remain in braking contact with the tread surface of the wheel 5. It will be apparent from FIG. 1 that in order for the curvature of the braking surface of the brake shoe 4 to remain in braking contact with the tread surface of the wheel 5 as the brake shoe 4, brake head 6, and pin 59 move upward together with the other elements comprising the brake assembly 1 in response to the decrease in the load on the car resulting from detraining of all the passengers, the brake shoe 4, brake head 6, pin 59, brake rod 58, and nut member 48 must simultaneously move in the direction of the right hand. Since the internal clutch face 44 on the clutch member 43 is in clutching contact with the external clutch face 49 on the nut member 48 as the result of the brakes being applied, the above-mentioned movement in the direction of the right hand of the nut member 48 is effective, via the clutch member 43 and trunnion lugs 46 and 47 (FIG. 2) to rock the lever 31 counterclockwise, as viewed in FIG. 1, about the pin 40 against the yielding resistance of the fluid under pressure present in the chamber 25. Also, since the key 51, sleeve 54, washer 55 and nut 56 connect the nut member 48 to the sleeve member 52, this sleeve member 52 is moved in the direction of the right hand as the nut member 48 is moved in this direction in the manner explained above. As can be seen from FIG. 1, the spring 76 is effective via the ball bearing 74 to bias the washer 73 against the shoulder 72 on the sleeve member 52. Therefore, as the sleeve member 52 is moved in the direction of the right hand simultanously as the nut member 48, brake rod 58, pin 59, brake head 6 and brake shoe 4 are moved in this direction in response to the detraining of the passengers, as explained above, the washer 73 is moved in the direction of the right hand against the yielding resistance of the spring 76 out of abutting relationship with the stop 80.

Let it now be supposed that a brake release is effected by venting fluid under pressure from the chamber 25 to atmosphere in the usual manner.

As the lever 31 is now rocked counterclockwise by the spring 21 in response to the venting of fluid under pressure from the chamber 25, the clutch member 43 is moved in the direction of the right hand, as viewed in FIG 1, so that the internal clutch face 44 on this clutch member 43 is moved out of clutching contact with the external clutch face 49 on the nut member 48. When the internal clutch face 44 on the clutch member 43 is thus moved out of clutching contact with the external clutch face 49 on the nut member 48, the spring 76 is rendered effective to cause the nut member 48 to rotate or "spin" on the stationary brake rod 58 and thereby travel longitudinally along the brake rod in the direction of the left hand, as viewed in FIG. 1, until the spring 76 expands sufficiently to move the left-hand side of the washer 73 into abutting relationship with the stop 80.

As the brake lever 31 continues to be rocked counterclockwise by the release spring 21, the clutch member 43 will be correspondingly moved in the direction of the right hand, as viewed in FIG. 1, until the internal clutch face 45 on this clutch member is moved into clutching contact with the external clutch face 53 on the sleeve member 52 if this has not previously occurred due to the action of spring 76. Thereafter, the continued counterclockwise rocking of the brake lever 31 by the spring 21 will return all elements of the brake assembly 1 to the position in which they are shown in FIG. 1.

In view of the foregoing, it is apparent that upon initiating a brake release, subsequent to detraining the passengers from the car while the brakes on the car are applied, the rotatable nut member 48 is moved longitudinally in the direction of the left hand along the brake rod 58, as it is "spun" thereabout, a sufficient distance to correspondingly reduce the effective length of the brake rod 58 as to insure proper or constant brake shoe clearance between the braking surface of the brake shoe 4 and the tread surface of the wheel 5 while the brakes are released.

When the brake shoe 4 has completely worn out and it is replaced with a new shoe, it is necessary to reduce the length of brake rod 58 since the thickness of the new brake shoe is greater than that of the worn shoe. The length of brake rod 58 may be reduced by a workman first inserting a pry bar, while the brakes are released, between the braking surface of the brake shoe 4 and the tread surface of the wheel 5, and, thereafter, rocking this pry bar about the tread surface of the weel 5 as a fulcrum in the direction to transmit a force to the brake shoe 4 which force acts in the direction of the right hand, as viewed in FIG. 1. This force thus exerted by the pry bar on the brake shoe 4 is transmitted to the brake head 6 and thence via the pin 59 to the brake head hanger 8 and the brake rod 58 whereupon the brake head hanger 8 is rocked counterclockwise about the pin 62 and, simultaneously, the brake rod 58 is moved in the direction of the right hand, as viewed in FIG. 1.

The above-mentioned movement of the brake rod 58 in the direction of the right hand is transmitted to the nut member 48, to which the sleeve 52 is connected by the key 51, via the non-self-locking type of extrenal threads on the brake rod 58 and the non-self-locking type of internal screw threads on the nut member 48. Consequently, as the brake rod 58 is moved in the direction of the right hand by the workman rocking the pry bar in the manner described above, the external clutch face 53 on the left-hand end of the sleeve member 52 is moved out of clutching contact with the internal clutch face 45 or the clutch member 43.

As the external clutch face 53 on the left-hand end of the sleeve member 52 is thus moved out of clutching contact with the internal clutch face 45 on the clutch member 43, the spring 76, which transmits a force to the sleeve member 52 via the ball bearing 74, washer 73 and shoulder 72 on this sleeve member 52, is rendered effective to cause the sleeve member 52, nut member 48, sleeve 54, washer 55 and nut 56 to "spin" on the brake rod 58 and thereby travel longitudinally therealong in the direction of the left hand as the brake rod 58 is moved in the direction of the right hand in response to the force transmitted thereto from the pry bar.

From the foregoing, it is apparent that the workman, by use of the pry bar, can cause the effective length of the brake rod 58 to be reduced sufficiently to enable him to replace the worn brake shoe with a new brake shoe. By first driving the brake shoe key 7 upward by the application of a series of hammer blows to the lower end of this key, the workman may remove this key and thereafter the worn out brake shoe 4. The new brake shoe can then be secured to the brake head 6 by means of this same brake shoe key 7.

Having now described the invention, what I claim as new and desire to secure by Letters Patent, is:

1. A tread brake assembly for applying a braking force to a wheel of a railway vehicle truck, said assembly comprising:
   (a) a casing secured to the vehicle truck and having a brake cylinder therein,
   (b) a piston operative in said brake cylinder and movable in opposite directions responsively to supply and release of fluid under pressure to and from a chamber at one side thereof,
   (c) a lever pivotally mounted on said casing and operatively connected adjacent one end to said piston for rocking movement by said piston,
   (d) a brake rod movably supported on said casing for axial movement substantially in a straight line, one end of said rod having a brake-shoe-carrying brake head pivotally mounted thereon, and
   (e) a double-acting slack adjuster mechanism interposed between and operatively connected to said lever and said brake rod, said double-acting slack adjuster mechanism comprising:
      (i) a double clutch mechanism having:
         (1) an annular clutch element pivotally carried by said lever and having a pair of axially-spaced clutch faces, and
         (2) a second clutch element coaxially related to said annular clutch element and having a pair of axially-spaced clutch faces for respective cooperation with said clutch faces on said annular clutch element,
         (3) said second clutch element constituting a nut member having internal non-self-locking screw threads, and said brake rod having external non-self-locking screw threads whereby said nut member is rotatively mounted on said brake rod,
      (ii) two spaced-apart stops on said casing,
      (iii) two spaced-apart spring seats in coaxial alignment with said two stops,
      (iv) a caged spring interposed between said spring seats and normally effective to bias one of said seats against one of said stops and the other of said seats against said second clutch element, and
      (v) a spring carried by said casing for constantly exerting a force in a brake-applying direction on said brake rod independently of said lever,
      (vi) said caged spring being effective to cause rotation of said second clutch element relative to said brake rod to decrease the effective length of said rod in response to the further rocking of said lever in one direction subsequent to the brake shoe contacting the tread surface of the wheel and prior to movement of the other of said spring seats into abutting relationship with the other of said stops, and
      (vii) said spring and said caged spring being effective upon rocking of said lever in a direction opposite said one direction subsequent to said rocking in said one direction through an angle greater than a chosen angle incidental to brake shoe wear to cause rotation of said second clutch element relative to said brake rod to increase the effective length of said rod.

2. A tread brake assembly, as claimed in claim 1, further characterized in that said annular clutch element is pivotally connected by a trunnion to that end of said lever opposite said one end to which said piston is operatively connected.

3. A tread brake assembly, as claimed in claim 1, further characterized in that said one end of said brake rod is pivotally connected to one end of a brake head hanger the opposite end of which is rockably mounted on said casing, and in that a spring is interposed between said casing and said hanger for constantly biasing via said hanger said brake rod toward a corresponding wheel of the railway vehicle truck.

4. A tread brake assembly, as claimed in claim 3, further characterized by means for providing limited transverse movement of said brake-shoe-carrying brake head relative to said brake rod and said brake head hanger to enable the brake shoe carried by said brake head to move transversely with respect to said casing simultaneously with said car wheel.

5. A tread brake assembly, as claimed in claim 3, furthere characterized in that said lever is provided intermediate its ends with an opening through which said spring extends.

6. A slack adjuster mechanism for a wheel tread brake assembly having a brake lever and a non-rotatable brake rod through which a brake-applying force is transmitted to the wheel, said mechanism comprising:
   (a) an annular clutch element pivotally carried by the brake lever and having a pair of axially-spaced clutch faces,
   (b) a second clutch element having a pair of axially-spaced clutch faces for respective cooperation with said clutch faces on said annular clutch element, said second clutch element constituting a nut member having internal non-self-locking screw threads, and said brake rod having external non-self-locking screw threads whereby said nut member is rotatively mounted on said brake rod,
   (c) a first spring effective at one time to exert a force on said nut member in a brake-releasing direction and at another time to exert a force on said nut member in a brake-applying direction,
   (d) a second spring always effective to exert a force on the brake rod in a brake-applying direction, and
   (e) stop means for limiting the degree of spinning of said nut member in each of said directions,
   (f) said first and second springs being cooperatively operative at said one time only while said two pairs of clutch faces are disengaged for spinning said nut member in one direction of rotation about said brake rod to increase the effective length of said brake rod, and operatve at said another time only while said two pairs of clutch faces are disengaged for spinning said nut member in an opposite direction of rotation about said brake rod to decrease the effective length of said brake rod.

7. A slack adjuster mechanism, as claimed in claim 6, further characterized in that said stop means comprises a pair of axially spaced stops carried by the said casing, and in that said other spring is caged and disposed between said pair of axially spaced stops so as to be movable in opposite directions into and out of abutting relationship with said stops.

8. A slack adjuster mechanism, as claimed in claim 7, further characterized in that said caged spring is normally interposed between one of said stops and said nut member, and that said caged spring is expandable into abutting relationship with both of said stops upon a chosen degree of movement in said one direction of the brake rod and is recompressed and moved out of abutting relationship with said one stop upon the degree of movement of the brake rod in said one direction exceeding said chosen degree whereupon said caged spring is subsequently rendered effective to cause spinning of said nut member in said one direction upon subsequent movement of said annular clutch element in said opposite direction.

9. A slack adjuster mechanism, as claimed in claim 6, further characterized in that said caged spring is normally interposed between one of said stops and said nut member, and in that, upon the degree of movement of the brake rod in said one direction incident to brake application being less than said chosen degree, said caged spring is expandable, while said clutch faces are disengaged, to cause spinning of said nut member in said opposite direction until said caged spring is moved into abutting relationship with the other of said stops thereby terminating said spinning of said nut member.

References Cited
UNITED STATES PATENTS

| | | | |
|---|---|---|---|
| 3,190,403 | 6/1965 | Bushnell | 188—203 X |
| 3,430,739 | 3/1969 | Persson et al. | 188—202 |
| 3,430,740 | 3/1969 | Larsson et al. | 188—202 |

DUANE A. REGER, Primary Examiner

U.S. Cl. X.R.

188—196